US007577565B2

(12) United States Patent
Anandakumar et al.

(10) Patent No.: US 7,577,565 B2
(45) Date of Patent: Aug. 18, 2009

(54) ADAPTIVE VOICE PLAYOUT IN VOP

(75) Inventors: Krishnasamy Anandakumar, Dallas, TX (US); Alan McCree, Dallas, TX (US); Erdal Paksoy, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/136,662

(22) Filed: Jun. 10, 2008

(65) Prior Publication Data

US 2008/0243495 A1 Oct. 2, 2008

Related U.S. Application Data

(63) Continuation of application No. 10/081,355, filed on Feb. 21, 2002, now abandoned.

(60) Provisional application No. 60/270,264, filed on Feb. 21, 2001.

(51) Int. Cl.
*G10L 11/06* (2006.01)
*G10L 15/00* (2006.01)
*G10L 21/00* (2006.01)

(52) U.S. Cl. ........................ 704/208; 704/214; 704/233

(58) Field of Classification Search ................ 704/208, 704/214, 233
See application file for complete search history.

(56) References Cited

U.S. PATENT DOCUMENTS

| | | | | |
|---|---|---|---|---|
| 5,414,796 | A * | 5/1995 | Jacobs et al. | 704/221 |
| 5,742,930 | A * | 4/1998 | Howitt | 704/502 |
| 5,839,110 | A * | 11/1998 | Maeda et al. | 704/275 |
| 6,175,871 | B1 * | 1/2001 | Schuster et al. | 709/231 |
| 6,311,154 | B1 * | 10/2001 | Gersho et al. | 704/219 |
| 6,351,730 | B2 * | 2/2002 | Chen | 704/229 |
| 6,369,722 | B1 * | 4/2002 | Murgia et al. | 341/50 |
| 6,393,394 | B1 * | 5/2002 | Ananthapadmanabhan et al. | 704/230 |
| 6,604,070 | B1 * | 8/2003 | Gao et al. | 704/222 |
| 6,826,527 | B1 * | 11/2004 | Unno | 704/223 |
| 2002/0062209 | A1 * | 5/2002 | Choi | 704/208 |
| 2003/0009325 | A1 * | 1/2003 | Kirchherr et al. | 704/211 |
| 2003/0135374 | A1 * | 7/2003 | Hardwick | 704/264 |

* cited by examiner

*Primary Examiner*—David R Hudspeth
*Assistant Examiner*—Justin W Rider
(74) *Attorney, Agent, or Firm*—Mirna G. Abyad; Wade J. Brady, III; Frederick J. Telecky, Jr.

(57) ABSTRACT

Packetized CELP-encoded speech playout with frame truncation during silence and frame expansion method dependent upon voicing classification with voiced frame expansion maintaining phasealignment.

7 Claims, 2 Drawing Sheets

*(PRIOR ARAT)*

FIG. 3
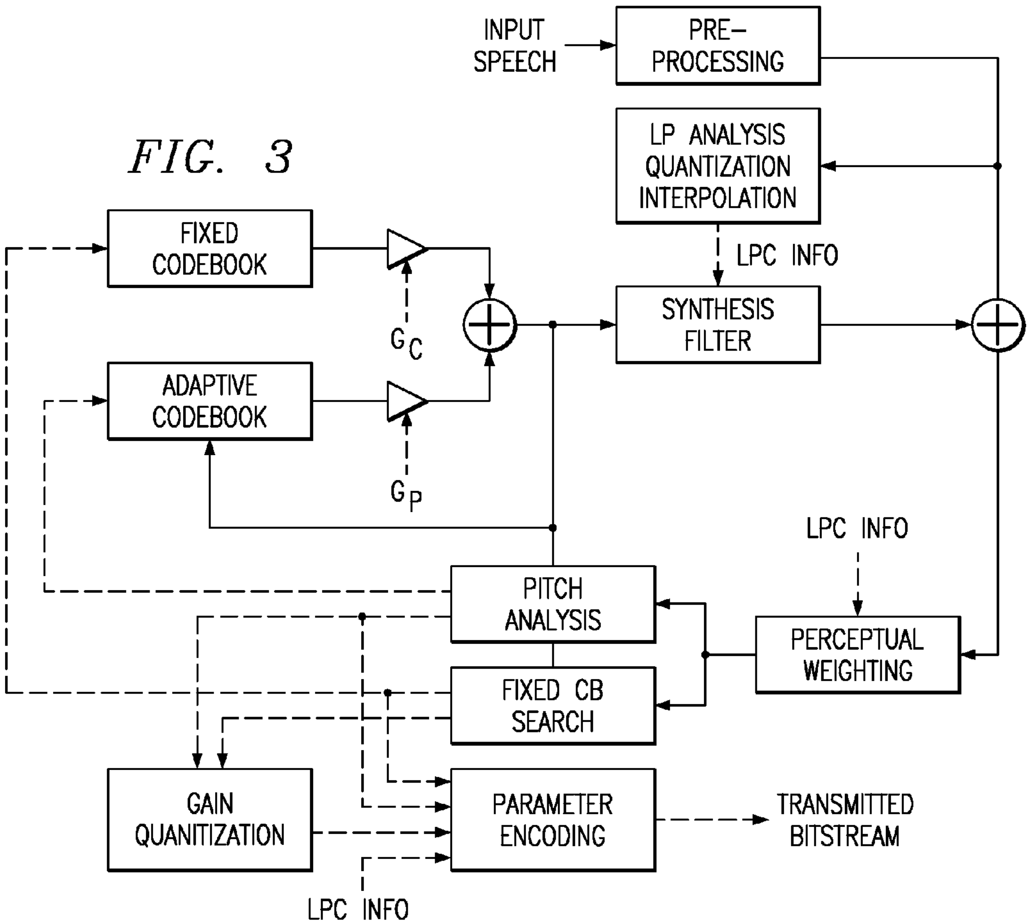
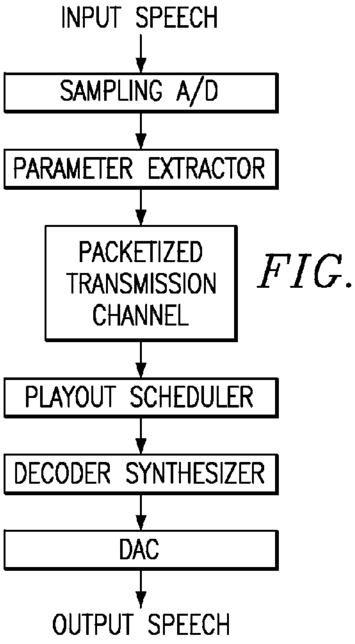
FIG. 5
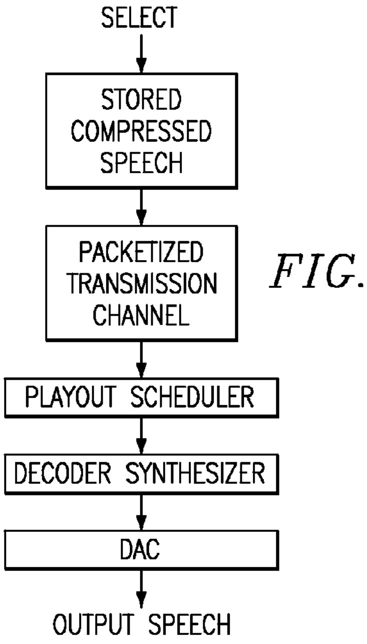
FIG. 6

ADAPTIVE VOICE PLAYOUT IN VOP

CROSS-REFERENCE TO RELATED APPLICATIONS

This application is a continuation application relating to U.S. patent application Ser. No. 10/081,355, filed on Feb. 21, 2002, which claims benefit of U.S. Provisional Patent Application Ser. No. 60/270,264, filed Feb. 21, 2001, all of which is herein incorporated by reference

BACKGROUND OF THE INVENTION

The invention relates to electronic devices, and more particularly to speech coding, transmission, and decoding/synthesis methods and circuitry.

The performance of digital speech systems using low bit rates has become increasingly important with current and foreseeable digital communications. Both dedicated channel and packetized-over-network (e.g., Voice over IP or Voice over Packet) transmissions benefit from compression of speech signals. The widely-used linear prediction (LP) digital speech coding compression method models the vocal tract as a time-varying filter and a time-varying excitation of the filter to mimic human speech. Linear prediction analysis determines LP coefficients ai, i=1,2, . . . , M, for an input frame of digital speech samples {s(n)} by setting $$r(n)=s(n)+\Sigma M\geqq\geqq 1\ ai\ s(n-i) \qquad (1)$$

and minimizing the energy Σr(n)2 of the residual r(n) in the frame. Typically, M, the order of the linear prediction filter, is taken to be about 10-12; the sampling rate to form the samples s(n) is typically taken to be 8 kHz (the same as the public switched telephone network sampling for digital transmission); and the number of samples {s(n)} in a frame is typically 80 or 160 (10 or 20 ms frames). A frame of samples may be generated by various windowing operations applied to the input speech samples. The name "linear prediction" arises from the interpretation of r(n)=s(n)+ΣM≧≧1 ai s(n−i) as the error in predicting s(n) by the linear combination of preceding speech samples—ΣM≧≧1 ai s(n−i). Thus minimizing Σr(n)2 yields the {ai} which furnish the best linear prediction for the frame. The coefficients {ai} may be converted to line spectral frequencies (LSFs) for quantization and transmission or storage and converted to line spectral pairs (LSPs) for interpolation between subframes.

The {r(n)} is the LP residual for the frame, and ideally the LP residual would be the excitation for the synthesis filter 1/A(z) where A(z) is the transfer function of equation (1). Of course, the LP residual is not available at the decoder; thus the task of the encoder is to represent the LP residual so that the decoder can generate an excitation which emulates the LP residual from the encoded parameters. Physiologically, for voiced frames the excitation roughly has the form of a series of pulses at the pitch frequency, and for unvoiced frames the excitation roughly has the form of white noise.

The LP compression approach basically only transmits/stores updates for the (quantized) filter coefficients, the (quantized) residual (waveform or parameters such as pitch), and (quantized) gain(s). A receiver decodes the transmitted/stored items and regenerates the input speech with the same perceptual characteristics. FIGS. 5-6 illustrate high level blocks of an LP system. Periodic updating of the quantized items requires fewer bits than direct representation of the speech signal, so a reasonable LP coder can operate at bits rates as low as 2-3 kb/s (kilobits per second).

The ITU standard G.729 uses frames of 10 ms length (80 samples) divided into two 5-ms 40-sample subframes for better tracking of pitch and gain parameters plus reduced codebook search complexity. Each subframe has an excitation represented by an adaptive-codebook contribution and a fixed (algebraic) codebook contribution. The adaptive-codebook contribution provides periodicity in the excitation and is the product of v(n), the prior frame's excitation translated by the current frame's pitch delay in time and interpolated, multiplied by a gain, gP. The fixed codebook contribution approximates the difference between the actual residual and the adaptive codebook contribution with a four-pulse vector, c(n), multiplied by a gain, gc. Thus the excitation is u(n)=gP v(n)+gc c(n) where v(n) comes from the prior (decoded) frame and gP, gc, and c(n) come from the transmitted parameters for the current frame. FIGS. 3-4 illustrate the encoding and decoding in block format; the postfilter essentially emphasizes any periodicity (e.g., vowels).

However, high error rates in wireless transmission and large packet losses/delays for network transmissions demand that an LP decoder handle frames which arrive too late for playout or in which so many bits are corrupted that the frame is ignored (erased). To maintain speech quality and intelligibility for wireless or voice-over-packet applications in the case of lost or erased frames, the decoder typically has methods to conceal such frame erasures. In particular, G.729 handles frame erasures and lost frames by reconstruction based on previously received information; that is, repetition-based concealment. Namely, replace the missing excitation signal with one of similar characteristics, while gradually decaying its energy by using a voicing classifier based on the long-term prediction gain (which is computed as part of the long-term postfilter analysis). The long-term postfilter finds the long-term predictor for which the prediction gain is more than 3 dB by using a normalized correlation greater than 0.5 in the optimal delay determination. For the error concealment process, a 10 ms frame is declared periodic if at least one 5 ms subframe has a long-term prediction gain of more than 3 dB. Otherwise the frame is declared nonperiodic. An erased frame inherits its class from the preceding (reconstructed) speech frame. Note that the voicing classification is continuously updated based on this reconstructed speech signal. The specific steps taken for an erased frame are as follows:

1) repetition of the synthesis filter parameters. The LP parameters of the last good frame are used.
2) attenuation of adaptive and fixed-codebook gains. The adaptive-codebook gain is based on an attenuated version of the previous adaptive-codebook gain: if the (m+1)st frame is erased, use gP(m+1)=0.9 gP(m). Similarly, the fixed-codebook gain is based on an attenuated version of the pervious fixed-codebook gain: gc(m+1)=0.98 gc(m).
3) attenuation of the memory of the gain predictor. The gain predictor for the fixed-codebook gain uses the energy of the previously selected fixed-codebook vectors c(n), so to avoid transitional effects once good frames are received, the memory of the gain predictor is updated with an attenuated version of the average codebook energy over four prior frames.
4) generation of the replacement excitation. The excitation used depends upon the periodicity classification. If the last reconstructed frame was classified as periodic, the current frame is considered to be periodic as well. In that case only the adaptive-codebook contribution is used, and the fixed-codebook contribution is set to zero. The pitch delay is based on the integer part of the pitch delay in the previous frame, and is repeated for each successive frame. To avoid excessive periodicity the pitch delay value is increased by one for each next subframe but bounded by 143 (pitch frequency of 70 Hz). In contrast, if the last reconstructed frame was classified as nonperiodic, the current frame is considered to be nonperiodic as well, and the adaptive codebook contribution is set to zero. The fixed-codebook contribution is generated by randomly selecting a codebook index and sign index. The frame classification allows the use of different decay factors for different types of excitation (e.g., 0.9 for periodic and 0.98 for nonperiodic gains). FIG. 2 illustrates the decoder with concealment parameters.

A major challenge in voice over packet (VOP) receivers is provision for continuous playout of voice packets in the presence of variable network delays (jitter). Continuous playout is often achieved by buffering the received voice packets for sufficient time so that most of the packets are likely received before their scheduled playout times. The playout delay due to buffering can be a fixed delay throughout the duration of a voice call or may adaptively vary during the call. Playout delay trades off packet losses (packet arrival after scheduled playout time) for overall delays. A very large playout delay ensures minimal packet losses but long gaps between messages and replies in two-way calls; and conversely, small playout delays leads to large packet losses but truly real-time conversation.

R. Ramjee et al, Adaptive Playout Mechanisms for Packetized Audio Applications in Wide-Area Networks, Proc. INFOCOM'94, 5d.3 (1994) and S. Moon et al, Packet Audio Playout Delay Adjustment: Performance Bounds and Algorithms, 5 ACM/Springer Multimedia Systems 17 (1998) schedule the playout times for all speech packets in a talkspurt (interval of essentially continuous active speech) at the beginning of the talkspurt. In particular, the playout time for the first packet in a talkspurt is set during the silence preceding the talkspurt, and the playout times of subsequent packets are just increments of the 20 ms frame length. The playout time of the first packet is taken as the then-current playout delay which can be determined by various algorithms: one approach has a normal mode and a spike mode. The normal mode would determine a playout delay as the sum of the filtered arrival delay of previously-arrived packets and a multiple of the filtered variation of the arrival delays; this provides a long-term adaptation. Spike mode would determine a playout delay from the arrival delay of the last-arrived packet during a delay spike (which is detected by a large gradient in packet delays); this provides a short-term adaptation. Ramjee et al and Moon et al use packets consisting of 160 PCM samples of speech sampled at the usual 8 kHz; that is, packetize 20 ms frames. And packets arriving after their scheduled playout times are discarded. Thus a large delay spike occurring within a talkspurt implies a sequence of lost packets because the playout delay cannot adjust until the next talkspurt.

Leung et al, Speech Coding over Frame Relay Networks, Proc. IEEE Workshop on Speech Coding for Telecommunications 75 (1993) describes an adaptive playout time for a CELP decoder which adjusts the playout delay by a fraction of the error of the current frame (packet) arrival delay from a target arrival delay. The playout delay is adjusted during a talkspurt by either extending or truncating the CELP excitation of a frame to one of the fixed lengths; that is, a 20 ms frame can be truncated to 10 or 15 ms only or extended to 25 or 40 ms only. Larger playout delay adjustments can be made only during silence frames. Also, lost or discarded packets (arriving after their playout times) can be reconstructed by using the CELP parameters of the last good frame together with bandwidth expansion of the LP coefficients and attenuation of the gains at 4 dB for successive reconstructed frames. Thus with a large delay spike (a sequence of late arriving and thus discarded frames), the initial lost frames could be reconstructions of the last good frame but would attenuate to essentially silence within a few frames. For isolated lost frames, both the prior and subsequent good frames can be used for two-sided prediction (e.g., interpolation) of CELP parameters for reconstruction.

However, these playout delay methods have poor results.

SUMMARY OF THE INVENTION

The present invention provides packetized CELP playout delay with short-term plus long-term adaptations together with adjustments during a talkspurt limited to frame expansions. Also, frame classification leads to alternative frame expansion methods.

This has advantages including improved performance for adaptive playout delay methods.

BRIEF DESCRIPTION OF THE DRAWINGS

FIGS. 3-4 are block diagrams of known CELP encoder and decoder.

FIGS. 5-6 illustrate systems.

DETAILED DESCRIPTION OF THE PREFERRED EMBODIMENTS

1. Overview

Preferred embodiment decoders and methods for playout buffer timing in CELP-encoded speech received as packets or frames over a network have one or more of the features: (1) playout delay determined by short-term plus long-term adaptations where the adaptation during a talkspurt is limited to frame expansion, (2) frame expansions for voiced frames in multiples of the pitch delay but unconstrained for unvoiced frames, (3) frame expansions for a transition frame either as a voiced frame or as only the unvoiced portion. The frame expansions use CELP parameters and, optionally, add bandwidth expansion and gain attenuation. The methods minimize the playout delay for better interactive performance while insuring all received packets get played out.

Figure 1:
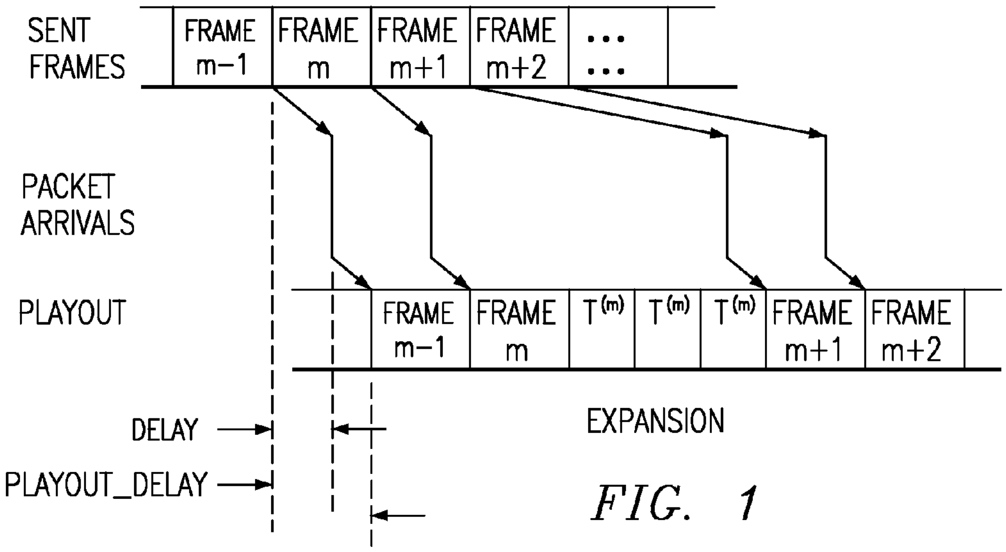
FIG. 1 illustrates a preferred embodiment.
Figure 2:
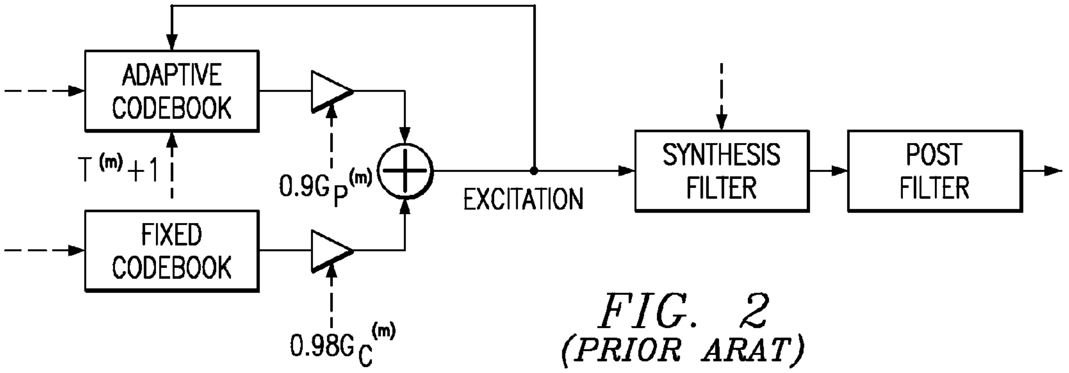
FIG. 2 shows known CELP decoder concealment.
Figure 4:
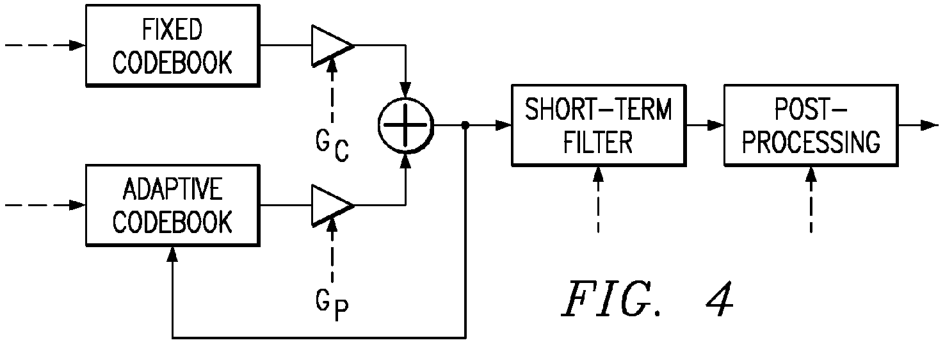

FIG. 1 illustrates a preferred embodiment expansion for a voiced frame: the packet with frame m+1 is delayed in the network, so the voiced frame m expands by three multiples of its pitch delay, T(m), to allow frame m+1 playout without a gap and with phase alignment due to expansion in multiples of the pitch delay.

Applications of the preferred embodiment playout methods extend to include hybrid packet-rate adaptation for congestion control, and voice-synchronization with other media. In particular, for hybrid packet-rate adaptation, a decrease in packet-rate (number of packets sent per second) occurs during both silence periods and active speech, but an increase in packet-rate occurs only during silence periods. The step of decreasing packet-rate during active speech uses the speech frame expansion at the receiver for handling playout delay change, and the preferred embodiment methods (frame voicing classification determining expansion approach) apply. Similarly, to synchronize packetized speech and video or other streaming media, the speech playout may be adjusted by the preferred embodiment methods using the video as the time base.

Preferred embodiment systems (e.g., Voice over IP or Voice over Packet) incorporate preferred embodiment playout methods in receivers/decoders and may include an air interface as part or all of the communications channel.

3. First Preferred Embodiment Playout Timing

To illustrate the first preferred embodiment playout buffer method, presume a received sequence of packets with each packet containing a CELP-encoded 10 ms frame of speech (or silence between talkspurts) and a send time stamp so the position of a packet in the sequence can be determined at the receiver regardless of the order of receipt or delay of individual packets. Thus a 10-minute conversation using such VOP corresponds to a sequence of 60000 packets received (and also 60000 sent in the other direction, one every 10 ms) with typically more than half of the packets containing a frame of silence (background noise during pauses or while the other conversant is talking).

The first preferred embodiment playout method schedules a playout time (decoding time) for a CELP frame in a packet as the later of (i) the packet's send time (time stamp) plus a delay threshold or (ii) the packet's arrival time. The delay threshold is set so that a high percentage (e.g., 98%) of recently arrived packets (e.g., the last 200 packets) likely have a delay less than or equal to the delay threshold. The delay threshold has a long-term adaptation. In more detail, let the variable "playout_delay" denote the playout delay (playout time minus send time) of the current packet in the received sequence of packets, the variable "delay" denote the delay (arrival time minus send time) of the current packet, and the variable "estimate" be the estimated delay threshold which has the percentage of packets with delay less than or equal to "estimate" at about DELAY_PERCENTILE, a constant such as 0.98. Then the playout delay derives from:

```
if (delay> playout__delay)
    playout__delay =delay; /* immediate delay increase (short term) */
    else
    playout__delay =estimate; /* long term */
```

And the filtering to generate "estimate" from "delay_threshold" is:

```
if (delay__threshold>estimate)
    estimate =PARAM1*estimate + (1-PARAM1)*delay__threshold;
    else
    estimate = PARAM2*estimate + (1-PARAM2)*delay__threshold;
```

where PARAM1 is a parameter roughly about 0.5 and PARAM2 is a parameter roughly about 0.9. This choice of PARAM1 and PARAM2 allows "estimate" to rapidly increase but only slowly decrease. The delay threshold derives from a histogram of the delays of the NUM_OF_PACKETS (e.g., 200) previously-arrived packets. Indeed, let "delays[ ]" be an array of size NUM_OF_PACKETS with entries being the delays of recently arrived packets; treat the array as a circular FIFO with read/write position indicator for the current packet as the variable "position". The histogram of delays is the array "distribution_fcn[ ]" with a delay quantized to the nearest 1 ms and the array has size 1000 so the histogram delay saturates at 1000 ms.

```
/* Remove old delay value */
if (delays[position] <= delay__threshold)
num__of__packets__played -= 1;
distribution__fcn[delays[position]] -= 1;
/* Get current packet delay */
delays[position] =delay;
/* Update the delay distribution with the current packet delay */
if (delays[position] <= delay__threshold)
num__of packets__played += 1;
distribution__fcn[delays[position]] += 1;
/* Update the delay threshold. */
while (num__of__packets__played <
NUM__OF__PACKETS*DELAY__PERCENTILE) {
num__of__packets__played -= distribution__fcn[delay__threshold];
delay__threshold += DELAY__STEP__SIZE;
}
while (num__of__packets__played <
NUM__OF__PACKETS*DELAY__PERCENTILE) {
delay__threshold += DELAY__STEP__SIZE;
num__of__packets__played += distribution__fcn[delay__threshold];
}
/* Update position */
position = (position+1)%NUM__OF__PACKETS;
```

where DELAY_STEP_SIZE is the delay quantization step size, e.g., 1 ms. The variable "num_of_packets_played" is the number of packets within the NUM_OF_PACKETS recently-arrived packets which would have delays that are less than or equal to the current delay threshold.

As an example of the foregoing, presume an initial normal distribution of packet delays with mean 110 ms and standard deviation 10 ms, so 98% of the delays would be less than or equal to about 130 ms. If 200 packet delays are used in the histogram, then 4 of the 200 delays would be expected to exceed 130 ms. Indeed, presume the six largest delays are 129, 130, 132, 135, 140, and 147 ms; then the value of "delay_threshold" would equal 130. If such a distribution of delays had persisted for a time, then "estimate" would also equal 130, and the scheduled playout time for a timely packet would be the packet's send time plus 130 ms. Now presume a delay spike in which the packet's delay jumps to 180 ms for 10 consecutive packets and then drops back to the distribution about 110 ms. For this spike "playout_delay" would immediately jump to 180 (short-term adaptation) and thus the playout times for these 10 packets be scheduled as arrival time which equals send time plus 180 ms. Simultaneously, "delay_threshold" should increase from 130 to 132 to 135 to 140 to 147 to 180 and stay there for 200 packets before dropping back at roughly the same rate to about 130. And as "delay_threshold" increases, "estimate" also increases, but more slowly due to the filtering; in particular, "estimate" increases from 130 to 131 (=0.5*130+0.5*132) to 133 (=0.5*131+0.5*135) to 137 (=0.5*134+0.5*140) to 142 (=0.5*137+0.5*147) to 161 (=0.5*142+0.5*180) and so forth as "estimate" asymptotically approaches 180. Then 200 packets after the delay spike the histogram begins losing the 10 delays of 180 and "estimate" begins to slowly drop. Indeed, if "playout_delay" drops from 180 to 147 to 140 to 135 to 132 to a sequence of 130s, then "estimate" decreases from 180 to 176 (=0.9*180+0.1*147) to 172 (=0.9*176+0.1*140) to 168 (=0.9*172+0.1*135) to 164 (=0.9*168+0.1*132) to 160 (=0.9*164+0.1*130) and so forth to slowly asymptotically approach 130. In summary, the spike causes a short-term (following "delay") jump of "playout_delay" to 180 which then long-term (following "estimate") persists for 200 packets (the size of the histogram) and then slowly decays back to 130.

When the playout delay for the current frame is an increase over the playout delay for the prior frame, there will be a time gap between the end of the prior frame and the beginning of the current frame, so the preferred embodiments expand the prior frame to fill the gap. This expansion applies whether the prior frame is active speech or silence. Contrarily, when the playout delay is to decrease, such as when "delay" drops below "estimate", then if the packet has a frame of silence, the current frame is compressed; otherwise if the packet has a frame of active speech, the decrease is put off until a frame of silence occurs. In particular, with the variable "new_playout_delay" for the current frame equal to "playout_delay" for the next frame, modification of the current frame decoding follows as:

```
if (new__playout__delay > playout__delay) {/* playout delay increase */
    modification =EXPANSION;
}
else if (new__playout__delay < playout__delay) {/* playout delay
decrease */
if (type == ACTIVE__SPEECH)
modification =NO__MODIFICATION;
else
modification = SILENCE__COMPRESSION;
}
```

In the foregoing the variable "modification" sets the decoding to expand, compress, or not change the decoded frame length from the encoded frame length of 10 ms. Indeed, for EXPANSION invoke a frame expansion method as described in the following section, and for SILENCE_COMPRESSION truncate the (silence) frame (e.g., truncate the excitation) by the amount "playout_delay"—"new_playout_delay". If this truncation exceeds the frame length, then extend to subsequent silence frames. Further, for an active speech frame with NO_MODIFICATION, the compression is pushed to the next packet by increasing "playout_delay" for the next packet to equal "playout_delay" for the current packet.

Alternative preferred embodiment methods for frame expansion may be used as described in the next section. Some frame expansion methods include gain attenuation and bandwidth expansion, and in this case the gap at the onset of a large delay spike is filled with a sequence of fading versions of the last timely-arrived frame prior to the spike.

3. Preferred Embodiment Frame Expansions

Preferred embodiment frame expansion methods first perform a voicing classification of the frame and then expand accordingly. Thus classify a frame as (1) voiced if the normalized correlation is larger than a threshold (e.g., 0.7 as in G.729 postfilter) or if the peakiness measure (ratio of L2 norm to L1 norm) is larger than a threshold (=1.3) plus the zero-crossing rate is smaller than another threshold (=0.3); otherwise the frame is classified as (2) unvoiced or as (3) a transition from unvoiced to voiced if a first subframe is unvoiced and a second subframe is voiced.

(1) Expand a voiced frame by integer multiples of the pitch delay (pitch period) of the frame, so the expanded frame ends at roughly the same phase as the original frame. That is, for "new_playout_delay" greater than "playout_delay", first form an excitation by N repeats of the last pitch-delay length portion of the excitation of the current frame where N is the smallest integer at least as large as ("new_playout_delay"—"playout_delay")/(pitch delay). Then apply this excitation to the LP synthesis filter of the current frame to generate the expansion of the current frame. Lastly, increase "playout_delay" for the frame of the next packet ("new_playout_delay" for the current packet) to equal the current frame "playout_delay"+N*(pitch delay); this aligns the start of the next frame with the end of the current frame expansion. Note that this alignment may make "playout_delay" exceed "delay" for the next packet; see FIG. 1.

(2) Expand an unvoiced frame by synthesize with repeats of the LP synthesis filter coefficients, pitch delay, and adaptive and fixed codebook gains, plus an excitation with a random fixed-codebook vector and an adaptive-codebook contribution.

(3) Expand an unvoiced-to-voiced transition frame by one of two preferred embodiment methods: the first method treats a transition frame as a voiced frame and follows the foregoing description for a voiced frame expansion. The second method expands only the initial unvoiced portion of the frame and follows the foregoing description of unvoiced frame expansion. In this second method the frame to be expanded is not fully played out; but rather the voiced latter portion is delayed and the expansion repeats would use the first subframe LP parameters. Thus the second method requires some look ahead to see that a expansion will be needed and then to prevent the final voiced portion from being played out until needed.

Alternate preferred embodiments for (1)-(3) attenuate the adaptive and fixed codebook gains by 1 dB for each 10 ms of expansion and apply bandwidth expansion to the LP coefficients. This gradually mutes the frame expansion for long expansions. Indeed, many detail variations may be used, including dropping the fixed-codebook contribution to the excitation for a periodic frame, dropping the adaptive-codebook contribution and using a random fixed-codebook vector for a nonperiodic frame, separate attenuation rates of adaptive and fixed codebook gains, incrementing the pitch delay during expansion, and so forth. The frame expansion preferred embodiments may be used with playout methods other than the preferred embodiment described in the foregoing.

4. Preferred Embodiment Truncations

Methods to synchronize voice with other media or adapt voice packet-rate when speech truncation is needed may use preferred embodiment truncation methods which are analogous to the foregoing speech expansion methods. (1) If the speech is voiced, it is truncated only in integer multiples of the pitch period; and (2) if the speech is unvoiced (including silences), no constraint on truncation is applied.

5. Preferred Embodiments for Lost Packets

When a packet appears lost or erased due to uncorrectable errors, such as when (several) packets containing frames later in the sequence of sent frames than the frame of the lost/erased packet are received, then interpolate to reconstruct without change of "playout_delay". Alternatively, wait up to a threshold time (e.g., 300 ms) with expansion of the prior frame before deciding that the packet is lost. For an isolated lost/erased packet, use G.729 concealment as described in the background or other concealment method.

6. System Preferred Embodiments

FIGS. 5-6 show in functional block form preferred embodiment systems which use a preferred embodiment playout method, both speech and also other signals which can be effectively CELP coded. In preferred embodiment communications systems users (transmitters and/or receivers) could include one or more digital signal processors (DSP's) and/or other programmable devices such as RISC processors with stored programs for performance of the signal processing of a preferred embodiment method. Alternatively, specialized circuitry (ASICs) could be used with (partically) hardwired preferred embodiments methods. Users may also contain analog and/or mixed-signal integrated circuits for amplification or filtering of inputs to or outputs from a communications channel and for conversion between analog and digital. Such analog and digital circuits may be integrated on a single die. The stored programs, including codebooks, may, for example, be in ROM or flash EEPROM or FeRAM which is integrated with the processor or external to the processor. Antennas may be parts of receivers with multiple finger RAKE detectors for air interface to networks such as the Internet. Exemplary DSP cores could be in the TMS320C6xxx or TMS320C5xxx families from Texas Instruments.

7. Modifications

The preferred embodiments may be modified in various ways while retaining one or more of the features of playout delay increase during a talkspurt but a decrease only during silence and voiced frame expansion by multiples of the pitch delay.

For example, the frame voicing classification may have more classes with two or more classes leading to frame expansions with multiples of the pitch delay but with differing excitations, interval (frame and subframe) size and sampling rate could differ; various gain attenualion rates and bandwidth expansion factors could be used, the CELP encoding may be layered (successively more bits to higher layers) and the playout frame expansion may only use the lower levels.

What is claimed:

1. A method for playout of packetized speech, comprising:

(a) expanding an active frame according to a voicing classification for an active speech frame, and wherein said expanding is performed when a playout delay for a current frame is greater than a playout delay for a prior frame;

(b) deferring truncation of said active speech frame; and (c) truncating a silence frame.

2. The method of claim 1, wherein:

(a) said packetized speech includes CELP-encoded frames; and (b) said truncating a silence frame includes truncating an excitation for said silence frame.

3. The method of claim 1 wherein said deferring occurs when a playout is to decrease.

4. The method of claim 1 further comprising truncating said silence frame by a difference between delay and a new playout delay.

5. A method of frame playout expansion, comprising:

(a) classifying a received active frame as one of (i) voiced, (ii) unvoiced, or (iii) transition;

(b) expanding an unvoiced frame by expanding an excitation for said unvoiced frame with a random fixed-codebook vector, and wherein said expanding is performed when a playout delay for a current frame is greater than a playout delay for a prior frame; and (c) expanding a voiced frame by a multiple of the pitch of said voiced frame.

6. The method of claim 5, wherein:

(a) said frames are CELP-encoded frames; and (b) said expanding a voiced frame includes expanding an excitation for said voiced frame by a multiple of the pitch of said voiced frame.

7. A receiver, comprising:

(a) an input for receiving CELP-encoded frames;

(b) a decoder coupled to said input; and (c) a playout scheduler coupled to said input and configuration to limit adaptation of said frames to expansion when an active frame is a voiced frame;

(d) said decoder performing expansion of a voiced frame in response to said playout scheduler, wherein said voice frame expansion is a multiple of the pitch for said voiced frame; and (e) said decoder performing truncation of a frame in response to said playout scheduler only when said frame is a silence frame.

* * * * *